(12) United States Patent
Ando

(10) Patent No.: US 8,522,740 B2
(45) Date of Patent: Sep. 3, 2013

(54) ENGINE STARTING SYSTEM IN RESPONSE TO MANUAL TRIGGER OPERATION

(75) Inventor: Katsuyuki Ando, Kasugai (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 11/730,002

(22) Filed: Mar. 29, 2007

(65) Prior Publication Data

US 2007/0227489 A1 Oct. 4, 2007

(30) Foreign Application Priority Data

Mar. 29, 2006 (JP) .................................. 2006-091570

(51) Int. Cl.
*F02N 11/08* (2006.01)
*H01H 47/00* (2006.01)

(52) U.S. Cl.
USPC ...................................... 123/179.3; 307/10.5

(58) Field of Classification Search
USPC .......... 123/179.2, 179.3; 701/113; 340/5.61, 340/5.64; 307/10.3, 10.6
See application file for complete search history.

(56) References Cited

U.S. PATENT DOCUMENTS

| | | | | |
|---|---|---|---|---|
| 4,236,594 A | * | 12/1980 | Ramsperger | 180/167 |
| 5,054,569 A | * | 10/1991 | Scott et al. | 180/167 |
| 5,689,142 A | * | 11/1997 | Liu | 307/10.5 |
| 5,736,935 A | * | 4/1998 | Lambropoulos | 340/426.16 |
| 5,751,073 A | * | 5/1998 | Ross | 307/10.5 |
| 5,818,330 A | * | 10/1998 | Schweiger | 340/426.13 |
| 5,861,816 A | | 1/1999 | Funakoshi et al. | |
| 5,874,785 A | * | 2/1999 | Liu | 307/10.5 |
| 5,955,940 A | * | 9/1999 | Chen | 340/426.17 |
| 6,116,201 A | * | 9/2000 | LaBelle | 123/179.2 |
| 6,227,158 B1 | * | 5/2001 | LaBelle | 123/179.3 |
| 6,351,703 B1 | * | 2/2002 | Avery, Jr. | 701/112 |
| 6,392,312 B1 | * | 5/2002 | Morris | 290/40 C |
| 6,700,220 B2 | * | 3/2004 | Bayeur et al. | 307/10.2 |
| 6,786,846 B2 | * | 9/2004 | Chang | 477/99 |

(Continued)

FOREIGN PATENT DOCUMENTS

JP 08-244558 9/1996
JP 2001-278010 10/2001

(Continued)

OTHER PUBLICATIONS

Extended European Search Report dated Nov. 26, 2008 issued in counterpart EP Application No. 07 006 317.7-1263.

(Continued)

*Primary Examiner* — Stephen K Cronin
*Assistant Examiner* — Sizo Vilakazi
(74) *Attorney, Agent, or Firm* — Nixon & Vanderhye PC

(57) ABSTRACT

In a system, a setting unit sets historical information in response to a manual transient operation. The manual transient operation triggers automatic start of the engine. The historical information represents that the manual transient operation has existed. A validation unit has a first identifier uniquely identifying the vehicle. The validation unit carries out validation communications, in at least one of direct and indirect procedures, with a communication device storing therein a second identifier of the vehicle. The communication device is used by a user of the vehicle. The validation communications use the first and second identifiers. The validation unit validates whether the user is certificated based on the validation communication result. An engine starting unit automatically starts the engine when the historical information has been set by the setting unit and when it is determined that the user of the vehicle is certificated.

33 Claims, 9 Drawing Sheets

(56) References Cited

U.S. PATENT DOCUMENTS

| | | | |
|---|---|---|---|
| 6,865,451 B2* | 3/2005 | Onoyama et al. | 701/2 |
| 6,871,624 B2* | 3/2005 | Janisch | 123/179.2 |
| 6,918,368 B2* | 7/2005 | Nantz et al. | 123/179.2 |
| 6,983,726 B1* | 1/2006 | Luo et al. | 123/179.2 |
| 7,407,464 B2* | 8/2008 | Tanioka et al. | 477/203 |
| 7,483,784 B2* | 1/2009 | Hata | 701/113 |
| 2003/0135321 A1 | 7/2003 | Kumazaki et al. | |
| 2004/0168663 A1* | 9/2004 | Matsuura et al. | 123/179.2 |
| 2006/0087405 A1* | 4/2006 | Koike et al. | 340/5.64 |
| 2008/0127926 A1* | 6/2008 | Kim | 123/179.2 |
| 2008/0210187 A1* | 9/2008 | Sugano et al. | 123/179.3 |

FOREIGN PATENT DOCUMENTS

| | | |
|---|---|---|
| JP | 2001-289142 | 10/2001 |
| JP | 2002-221132 | 8/2002 |
| JP | 2003-301764 | 10/2003 |
| JP | 2005-125929 | 5/2005 |
| JP | 2005-248859 | 9/2005 |
| JP | 2005-299468 | 10/2005 |

OTHER PUBLICATIONS

Office Action dated Oct. 27, 2009 issued in corresponding Japanese Application No. 2006-091570 with an at least partial English language translation thereof.

* cited by examiner

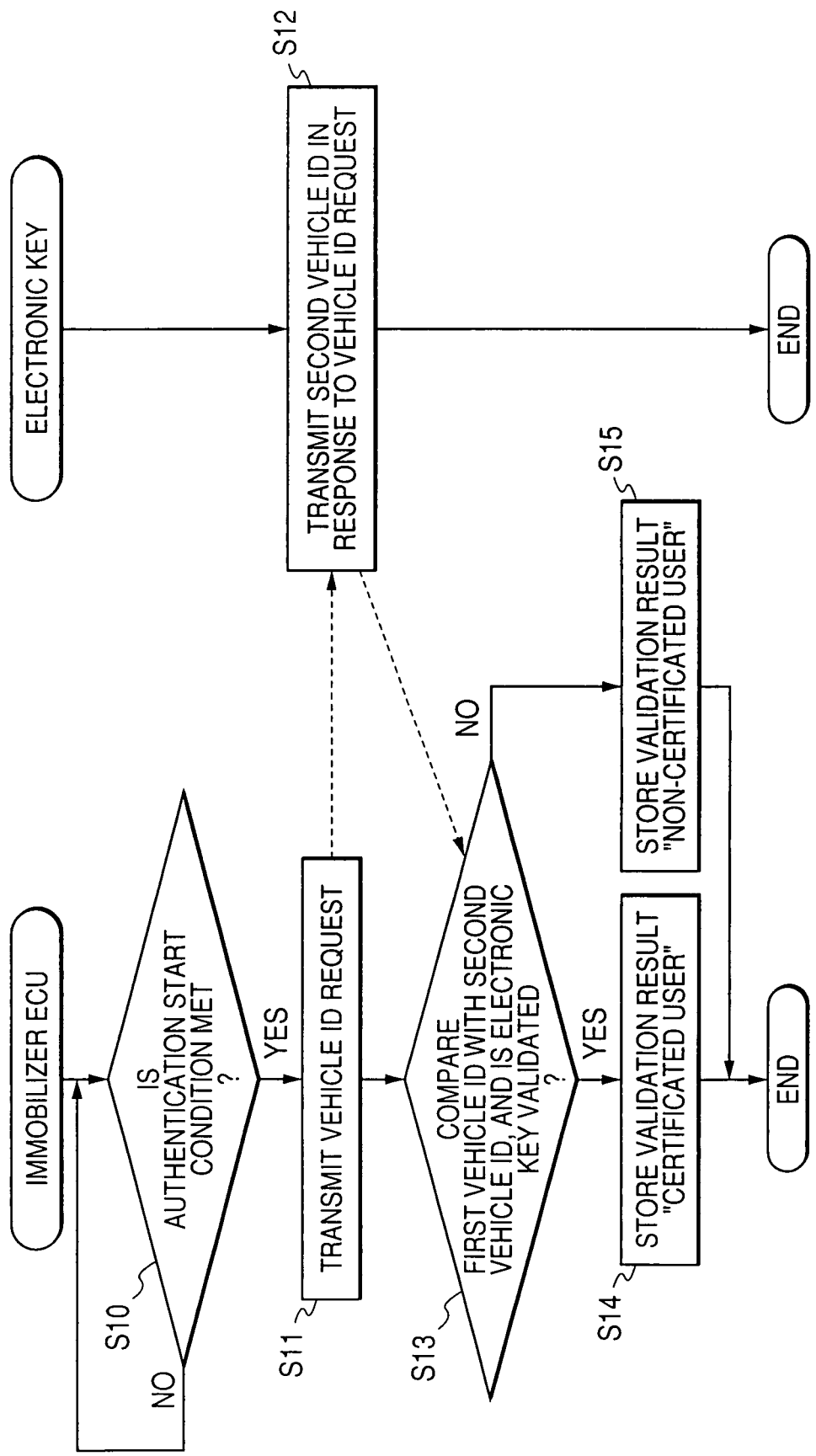

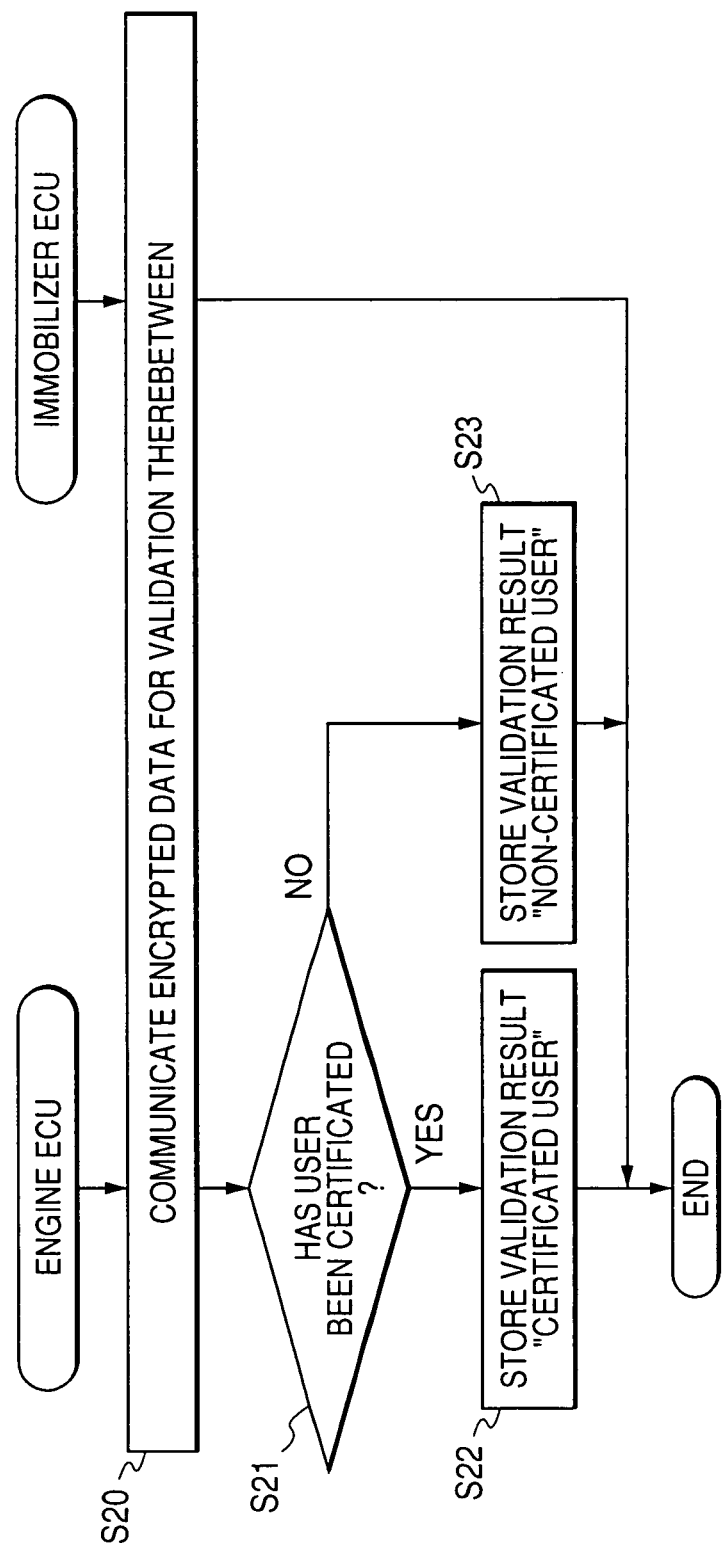

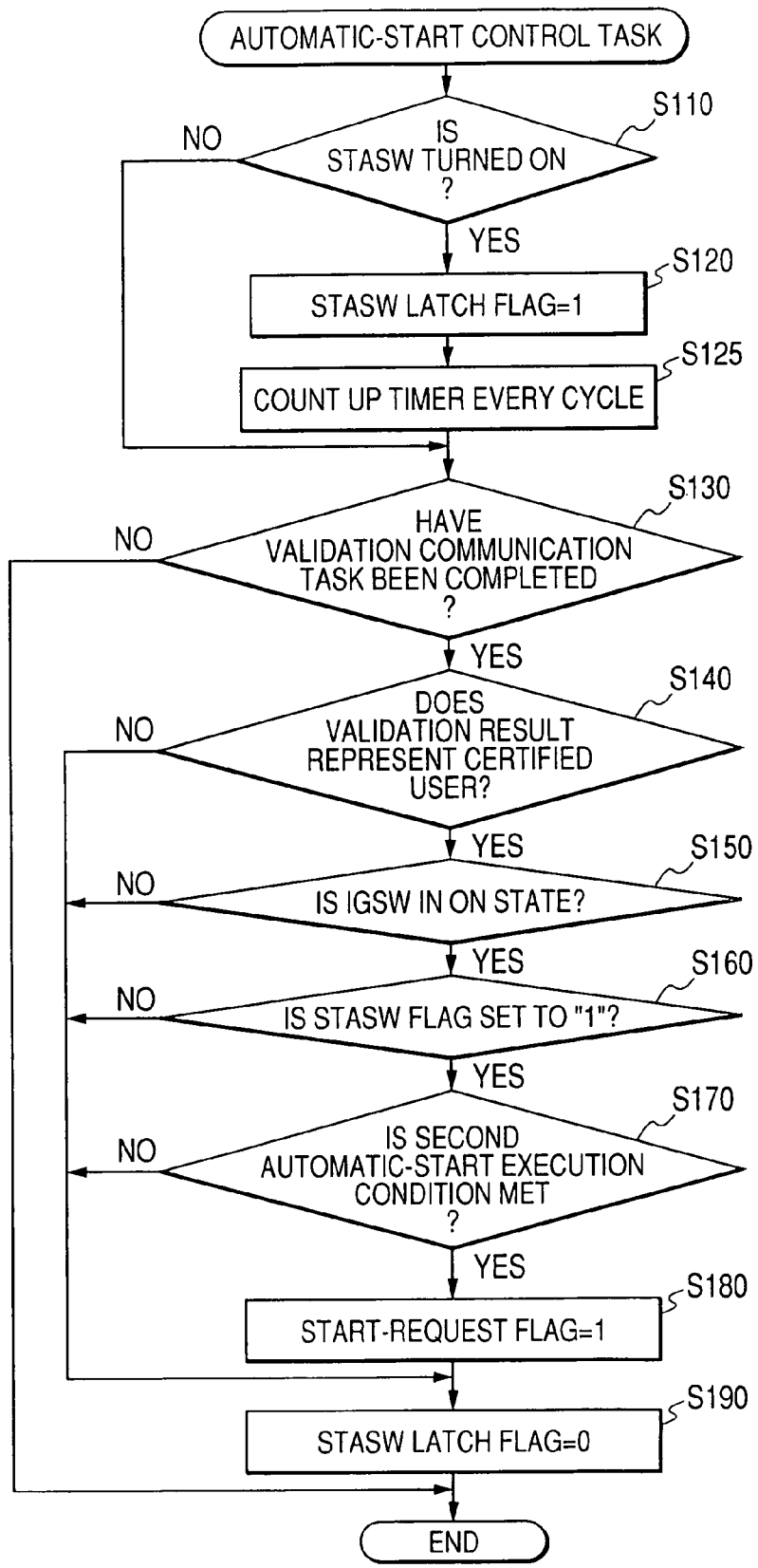

ations. The manual transient operation triggers automatic start of the engine. The historical information represents that the manual transient operation has existed.

ENGINE STARTING SYSTEM IN RESPONSE TO MANUAL TRIGGER OPERATION

CROSS REFERENCE TO RELATED APPLICATIONS

This application is based on Japanese Patent Application 2006-91570 filed on Mar. 29, 2006. This application claims the benefit of priority from the Japanese Patent Application, so that the descriptions of which are all incorporated herein by reference.

FIELD OF THE INVENTION

The present invention relates to engine starting systems for automatically starting an engine in response to a manual trigger operation.

BACKGROUND OF THE INVENTION

Recently, systems for automatically starting vehicle engines have been proposed and practically used, examples of which are disclosed in Japanese Unexamined Patent Publications No. 2002-221132 and No. 2005-248859.

Specifically, such an engine automatic starting system installed in a vehicle is operative to communicate by radio with a mobile device of the vehicle's user to authenticate whether the vehicle's user is validated.

When it is authenticated that the vehicle's user is validated, and it is determined that a starter switch of the vehicle is in on state, the engine automatic starting system automatically drives a starter motor of an engine until air-fuel mixture fed into the combustion chamber of a cylinder of the engine allows complete combustion to take place.

As compared with a manual engine starter system that drives the starter motor while the starter switch is in on state, the engine automatic starting system can eliminate the need for the user to continue manual operations for engine starting until air-fuel mixture fed into the combustion chamber of a cylinder of the engine allows complete combustion to take place. This makes it possible to improve the salability of vehicles installing the engine automatic starting system, and to prevent the starter motor from being driven when it is not needed, such as while the vehicle is moving.

In the engine automatic starting system, when the starter switch is turned off before it is authenticated that the vehicle's user is validated, it may be determined that requirements for automatically starting the engine are not satisfied. This is because the on state of the starter switch is one of the requirements for automatically starting the engine. Thus, when it is determined that the requirements are not satisfied due to the off state of the starter switch, engine automatic starting cannot be performed.

Especially, the problem probably tends to take place when a unit for communicating with a mobile device and a unit for executing the automatic starting operations are individually provided in an engine automatic starting system.

Specifically, as the unit for communicating with a mobile device, an immobilizer is normally installed in advance in a vehicle. The immobilizer is operative to store therein a unique ID (identifier) of the vehicle beforehand, receive an ID wirelessly transmitted from a mobile device, compare the ID stored therein with the received ID, and determine that the mobile device (the user thereof) is validated when the comparison result represents that both IDs are matched with each other.

As the unit for executing the automatic starting operations, an engine ECU (electronic control unit) for controlling the engine is installed in advance in the vehicle. The engine ECU is communicably coupled to the immobilizer via an in-vehicle local area network (LAN), such as a CAN (Controller Area Network). The engine ECU is operative to communicate with the immobilizer in encrypted form via the in-vehicle LAN to thereby receive the comparison result (authentication result) therefrom. This increases the delay time from start of the wireless communication between the immobilizer and the mobile device to completion of the validation determination by the engine ECU, which may cause the starter switch to be turned off before the validation determination is completed (see FIG. 8B).

Note that, as illustrated in FIG. 8A, in the manual engine starter system working to drive the starter motor during on state of the starter switch, even though the delay time is increased, a vehicle's user consciously keeps the starter switch on until cranking is started so that air-fuel mixture fed into the combustion chamber of a cylinder of the engine allows complete combustion to take place (t10 in FIG. 8A). For this reason, the increase of the delay time may not cause serious problems in the manual engine starter system.

In contrast, as illustrated in FIG. 8B, in the engine automatic starting system, even though the engine ECU determines that the validation result is proper (t12 in FIG. 8A), when the determination is carried out after the starter switch is turned off (t11 before t10 in FIG. 8B), the engine ECU cannot drive the starter motor.

SUMMARY OF THE INVENTION

In view of the background, an object of at least one aspect of the present invention is to provide systems operative to automatically start an engine in response to a manual transient operation; these systems are capable of stably starting the engine even though the manual transient operation has been terminated before completion of validation of a user.

According to one aspect of the present invention, there is provided a system for automatically starting an engine installed in a vehicle. The system includes a setting unit configured to set historical information in response to a manual transient operation. The manual transient operation triggers automatic start of the engine. The historical information represents that the manual transient operation has existed. The system includes a validation unit having a first identifier uniquely identifying the vehicle. The validation unit is configured to carry out validation communications, in at least one of direct and indirect procedures, with a communication device storing therein a second identifier of the vehicle. The communication device is used by a user of the vehicle. The validation communications use the first identifier and the second identifier. The validation unit is configured to validate whether the user of the vehicle is certificated based on the validation communication result. The system includes an engine starting unit configured to automatically start the engine when the historical information has been set by the setting unit and when it is determined that the user of the vehicle is certificated.

According to another aspect of the present invention, there is provided a program product embedded in a media accessible by a computer for automatically starting an engine installed in a vehicle. At least one of the media and another media accessible by the computer stores therein a first identifier uniquely identifying the vehicle. The program product includes first means for instructing a computer to set historical information in response to a manual transient operation.

The manual transient operation triggers automatic start of the engine. The historical information represents that the manual transient operation has existed. The program product includes second means for instructing a computer to carry out validation communications, in at least one of direct and indirect procedures, with a communication device storing therein a second identifier of the vehicle. The communication device is used by a user of the vehicle. The validation communications use the first identifier and the second identifier. The second means for instructing a computer to validate whether the user of the vehicle is certificated based on the validation communication result. The program product includes third means for instructing a computer to carry out an automatic starting operation of the engine when the historical information has been set by the setting unit and when it is determined that the user of the vehicle is certificated.

BRIEF DESCRIPTION OF THE DRAWINGS

Other objects and aspects of the invention will become apparent from the following description of embodiments with reference to the accompanying drawings in which:

FIG. 2A is a flowchart schematically illustrating operations of an immobilizer ECU and an electronic key according to the first embodiment;

FIG. 2B is a flowchart schematically illustrating validation communications between the engine ECU and the immobilizer ECU according to the first embodiment;

FIG. 3 is a flowchart schematically illustrating an automatic-start control task to be executed by a microcomputer of the engine ECU at regular intervals according to the first embodiment;

DETAILED DESCRIPTION OF EMBODIMENTS OF THE INVENTION

Embodiments of the present invention will be described hereinafter with reference to the accompanying drawings. In the individual embodiments, the present invention is applied to electronic control units (ECUs) serving as an engine starting system and installed in a vehicle in advance.

First Embodiment

Figure 1:
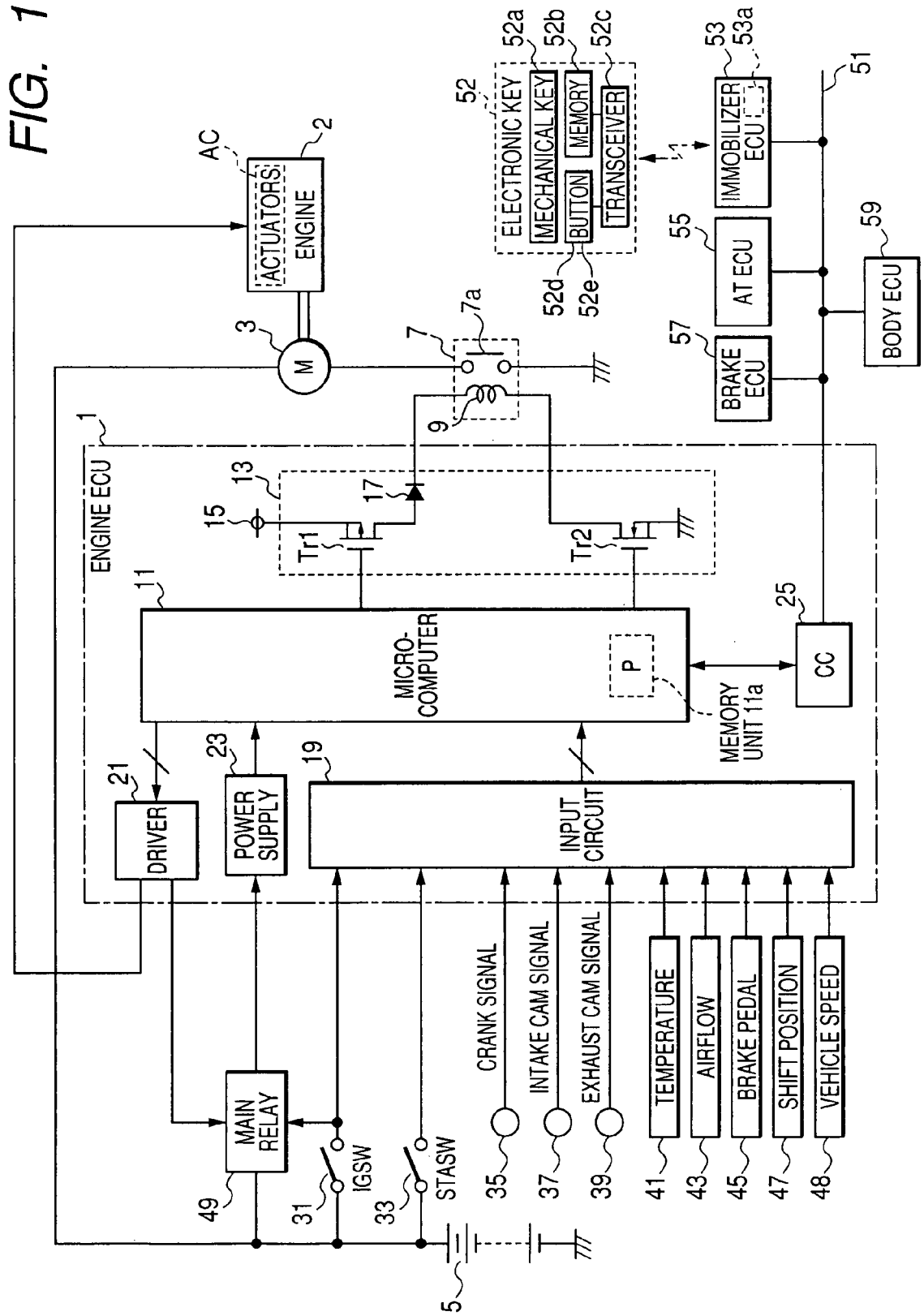
FIG. 1 is a block diagram schematically illustrating an example of the structure of a system including an engine ECU (Electronic Control Unit) and its peripheries according to a first embodiment of the present invention.

Referring to the drawings, in which like reference characters refer to like parts in several views, particularly to FIG. 1, there is illustrated an ECU 1 and its peripheral devices. Note that the ECU 1 serves as an engine ECU for controlling an engine 2 of the vehicle as a control target, but, in the first embodiment, descriptions of the ECU 1 will be focused on some components and operations thereof, which are required to automatically start the engine in response to a manually single trigger operation.

As illustrated in FIG. 1, a starter motor 3 for cranking has a pair of positive and negative terminals. The positive terminal of the starter motor 3 is continuously connected to a positive terminal of an in-vehicle battery 5. The negative terminal of the starter motor 3 is connected to a ground line via a contact 7a of a starter relay 7, and the ground line is connected to a negative terminal of the in-vehicle battery 5. A coil 9 of the starter relay 7 has one and the other ends that are connected to the ECU 1.

The ECU 1 is designed as a normal computer circuit integrated with an analog-to-digital (A/D) converter.

Specifically, the ECU 1 includes a microcomputer 11 operative to execute various tasks for controlling the engine 2, and a starter relay deriver 13 operative to energize the coil 9 in response to a starter-relay drive signal sent from the microcomputer 11. The energization of the coil 9 allows the coil 9 of the starter relay 7 to short-circuit, in other words, the starter relay 7 to be turned on.

The starter relay driver 13 is provided with a high-side transistor Tr1 consisting of a P-channel MOSFE™, a diode 17, and a low-side transistor Tr2 consisting of an N-channel MOSFET. The source of the high-side MOSFET Tr1 is connected to a power supply line 15 to which a battery voltage at the positive terminal of the battery 5 is supplied. The drain of the high-side transistor Tr1 is connected to the anode of the diode 17, and the cathode thereof is connected to one end of the coil 9.

The other end of the coil 9 is connected to the drain of the low-side transistor Tr2, and the source thereof is connected to the ground line.

The gates of the high-side and low-side transistors Tr1 and Tr2 are connected to the microcomputer 11. The microcomputer 11 is operative to send the starter-relay drive signal to each of the gates of the high-side and low-side transistors Tr1 and Tr2.

Specifically, in the first embodiment, the starter-relay drive signal with inactive levels are normally sent to the gates of the high-side and low-side transistors Tr1 and Tr2. For this reason, the high-side and low-side transistors Tr1 and Tr2 are kept off, so that the starter motor 3 is inactive.

In contrast, for example, upon starting of the engine 2, the starter-relay drive signal sent to the gates of the high-side and low-side transistors Tr1 and Tr2 are respectively turned from the inactive levels to active levels, This allows the high-side and low-side transistors Tr1 and Tr2 to be turned on.

It is possible therefore to cause a current to flow through the coil 9 based on the battery voltage of the power supply line 15 to thereby energize the coil 9 Energization of the coil 9 permits the contact 7a of the starter relay 7 to short-circuit (starter relay 7 is turned on). This allows the battery voltage of the battery 5 to be supplied to the starter motor 3, so that the starter motor 3 is activated, thereby cranking the engine 2.

The ECU 1 also includes an input circuit 19. The input circuit 19 works to input, to the microcomputer 11, various types of signals sent from the exterior of the ECU 1; these signals are required to control the engine 2.

Specifically, the input circuit 19 is connected to an ignition switch (IGSW) 31 installed in the vehicle. For example, when the ignition switch 31 is turned on by, for example, a driver, an ignition switch signal with an active level is input to the microcomputer 11 via the input circuit 19.

The input circuit 19 is connected to a starter switch (STASW) 33 installed in the vehicle for cranking the engine 2. In the first embodiment, the starter switch 33 is designed as a push button switch. When the starter switch 33 is pushed by a driver, a starter switch signal with an active level is input to the microcomputer 11 via the input circuit 19.

The input circuit 19 is connected to a crankshaft sensor 35, an inlet camshaft sensor 37, an exhaust camshaft sensor 39, a coolant temperature sensor 41, an airflow sensor 43, a brake pedal sensor 45, a shift position sensor 47, and a vehicle speed sensor 48.

The crankshaft sensor 35 works to measure a current rotational position of a crankshaft of the engine 2 as it rotates. A crank signal indicative of the measured rotational position of the crankshaft is output from the sensor 35 to be input to the microcomputer 11 via the input circuit 19. Note that the crank signal is configured to have a level repetitively varying in time like pulses with rotation of the crankshaft.

The intake camshaft sensor 37 works to measure a current rotational position of an intake camshaft of the engine 2 for opening and closing an intake valve thereof as the intake camshaft rotates. An intake cam signal indicative of the measured rotational position of the intake camshaft is output from the sensor 37 to be input to the microcomputer 11 via the input circuit 19.

The exhaust camshaft sensor 39 is operative to measure a current rotational position of an exhaust camshaft of the engine 2 for opening and closing an exhaust valve thereof as the exhaust camshaft rotates. An exhaust cam signal indicative of the measured rotational position of the exhaust camshaft is output from the sensor 39 to be input to the microcomputer 11 via the input circuit 19.

The coolant temperature sensor 41 works to measure a current engine coolant temperature. A coolant temperature signal indicative of the measured engine coolant temperature is output from the sensor 41 to be input to the microcomputer 11 via the input circuit 19.

The airflow sensor (meter) 43 works to measure a current amount of airflow through an intake manifold of the engine 2 to determine the amount of fuel to be delivered. An airflow signal indicative of the measured airflow is output from the sensor 43 to be input to the microcomputer 11 via the input circuit 19.

The brake pedal sensor 45 is operative to measure a current amount of movement of a brake pedal of the vehicle operated by a driver. A brake-pedal operation signal indicative of the measured mount of movement of the brake pedal is output from the sensor 45 to be input to the microcomputer 11 via the input circuit 19.

The shift position sensor 47 works to measure a current gear position (shift position) of an automatic transmission installed in the vehicle; this automatic transmission is configured to take the power from the engine 2 and transfer it to a drive shaft of the vehicle. Specifically, the gear position (shift position) represents a current gear ratio of the automatically transmission. A shift-position signal indicative of the measured shift position of the automatic transmission is output from the sensor 47 to be input to the microcomputer 11 via the input circuit 19.

The vehicle speed sensor 48 is operative to measure a current vehicle speed. A vehicle speed signal indicative of the measured vehicle speed is output from the sensor 48 to be input to the microcomputer 11 via the input circuit 19.

Specifically, the signals measured by the measurement devices 35, 37, 39, 41, 43, 45, 47, and 48 are associated with the operating conditions of the vehicle, and therefore the signals measured by the measurement devices 35, 37, 39, 41, 43, 45, 47, and 48 are input as items of vehicle operating condition data representing the operating conditions of the vehicle.

Note that, in the first embodiment, the input circuit 19 is collectively illustrated in FIG. 1. The input circuit 19 can be provided for each of the input signals to be input to the microcomputer 11. Specifically, the input circuits 19 are operative to process the corresponding input signals based on the types of the input signals, respectively.

For example, when an input signal sent to the input circuit 19 is any one of the crank signal, intake cam signal, the exhaust cam signal, and the switch signals, the input circuit 19 works to perform waveform shaping on the input signal. The waveform-shaped input signal is input to the microcomputer 11.

Moreover, when an input signal sent to the input circuit 19 is an analog signal, such as the coolant temperature signal or the airflow signal, the input circuit 19 works to eliminate high-frequency noise components and to input it to an input port of the microcomputer 11 for the A/D converter.

In addition, the ECU 1 includes a driver 21, a power supply circuit (power supply) 23, and a communication circuit (CC) 25; these components are connected to the microcomputer 11.

The driver 21 is connected to actuators of the engine 2, such as injectors and igniters, or actuators associated with operations of the engine 2. The driver 21 works to drive the actuators AC based on individual control signals sent from the microcomputer 11.

The power supply circuit 23 is connected to a main relay 49. The power supply circuit 23 works to generate a constant voltage, such as 5 V for the microcomputer 11, using the battery voltage fed from the main relay 49. The constant voltage permits the microcomputer 11 to operate.

The communication circuit 25 is connected to a communication line, such as a LAN, 51 installed in the vehicle. The communication circuit 25 works to communicate with other ECUs linked to the communication line 51 therethrough. For example, each of the other ECUs is designed as a normal computer circuit integrated with an analog-to-digital (A/D) converter.

Note that, in the first embodiment, the driver 21 is collectively illustrated in FIG. 1. The driver 21 can be provided for each of the actuators AC. In addition, the ECU 1 and the other ECUs can communicate with each other using CAN protocol as one of well-known communication protocols, but another communication protocol can be used.

The main relay 49 is connected between the positive terminal of the battery 5 and the power supply circuit 23. In addition, the main relay 49 is connected to the driver 21 and configured such that the ignition switch signal is input thereto.

When the ignition switch 31 is turned on, the main relay 49 is turned on, which allows the battery 5 to supply the battery voltage to the power supply circuit 23 of the ECU 1. The power supply circuit 23 generates the constant voltage based on the supplied battery voltage, and feeds the generated constant voltage to the microcomputer 11.

The microcomputer 11 is operative to control the driver 21 so as to turn on and off the main relay 49. When initiating operations by the turning on of the main relay 49 in response to the turning on of the ignition switch 31, the microcomputer 11 keeps the main relay 49 on-state. This allows the microcomputer 11 to continue operations even after the ignition switch 31 is turned off.

When operations required after the turning off of the ignition switch 31 are completed, the microcomputer 11 turns off the main relay 49, thereby shutting down.

As the other ECUs, an immobilizer ECU 53, a transmission ECU 55, a brake ECU 57, a body ECU 59, and the like are connected to the communication line 51. The immobilizer ECU 53 serves as an example of vehicle burglar devices.

A memory 53a of the immobilizer ECU 53 has stored therein a unique ID of the vehicle (first vehicle ID). The immobilizer ECU 53 works to communicate by radio with a mobile device (a control target) of users for the vehicle, such as an electronic key 52. The transmission ECU 55 works to control the automatic transmission as a control target. The brake ECU 57 works to control a brake system (control target) installed in the vehicle. The brake system is configured to enable the vehicle to slow and stop safely.

The body ECU 59 works to control lock and unlock of doors of the vehicle and control opening and closing of windows attached to the respective doors. The body ECU 59 is connected to a door state sensor 60 arranged to detect the state (for example, opening or closing) of each door.

Each of the ECUs 1, 53, 55, 57, 59 works to communicate data with another ECU; this data is required for each of the ECUs 1, 53, 55, 57, 59 to control a corresponding control target.

Note that the brake-pedal operation signal output from the brake pedal sensor 45, the shift-position signal output from the shift position sensor 47, and/or the vehicle-speed signal output from the vehicle speed sensor 48 are input to at least one of the other ECUs, such as the transmission ECU 55 and the brake ECU 57.

Specifically, the transmission ECU 55 works to control the gear ratio of the automatic transmission based on the shift-position signal. The brake ECU 57 works to control the brake system based on the brake-pedal operation signal.

In addition, the ECU 1 allows, from at least one of the other ECUs, reception of: information indicative of whether the brake pedal is operated by a driver, information indicative of the amount of movement of the brake pedal, information indicative of the shift position of the automatic transmission, information indicative of the vehicle speed, and the like.

As illustrated in FIG. 1, the electronic key 52 has a housing in which a mechanical key 52a is installed to be insertable and removable into/from the housing.

The electronic key 52 includes a memory 52b in which a unique ID of the vehicle (second vehicle ID) has been stored. The electronic key 52 also includes a transceiver 52c connected to the memory 52b and communicable by radio within a predetermined communicable area therearound.

The electronic key 52 further includes door lock and unlock buttons (push buttons) 52d and 52e attached to the housing of the electronic key 52 and connected to the transceiver 52c.

When the door lock button 52d is pushed by a driver, the transceiver 52c transmits a door lock signal within the communicable area by radio. When receiving the door lock signal or the mechanical key 52a is inserted into a key cylinder of the vehicle by a driver, the body ECU 59 controls door lock actuators for the respective doors so as to lock them.

Similarly, when the door unlock button 52e is pushed by a driver, or the mechanical key 52a is removed from the key cylinder by a driver, the transceiver 52c transmits a door unlock signal within the communicable area by radio.

When receiving the door unlock signal or the mechanical key 52a is inserted into a key cylinder of the vehicle by a driver, the body ECU 59 controls door lock actuators for the respective doors so as to unlock them.

The immobilizer ECU 53 periodically communicates with the body ECU 59 and determines whether an authentication start condition that a driver that tries to drive the vehicle gets thereinside is satisfied based on the communications with the body ECU 59 in step S10 of FIG. 2A.

For example, when determining that, after the driver's seat door is unlocked, the driver's seat door is closed, opened, and closed in this order based on the communications with the body ECU 59, the immobilizer ECU 53 recognizes that the authentication start condition is met (determination in step S10 is YES). Note that, when authentication start condition is not satisfied (determination in step S10 is NO), the immobilizer ECU 53 repeats the operation in step S10.

After the affirmative determination, the immobilizer ECU 53 transmits a vehicle ID request signal to an area in the vehicle compartment in or around which the driver's seat is located in step S11.

If the electronic key 52 is attached to the driver who is sitting in the driver's seat, the communicable area of the electronic key 52 allows the transceiver 52c to receive the vehicle ID request signal. Then, the transceiver 52c reads out the second vehicle ID from the memory 52b, and transmits the readout second vehicle ID to the immobilizer ECU 53 by radio in step S12.

The immobilizer ECU 53 receives the second vehicle ID sent from the electronic key 52, and compares the received second vehicle ID with the first vehicle ID stored in the memory 53a, thereby determining whether the electronic key 52, in other words, the driver holding the electronic key 52 is validated in step S13.

When the comparison result represents that both first and second IDs are matched with each other, the immobilizer ECU 53 determines that the electronic key 52, that is, the driver holding it, is validated, thereby storing in the memory 53a the validation result indicative of "certificated user" in step S14.

In contrast, when the comparison result represents that both first and second IDs are mismatched with each other, the immobilizer ECU 53 determines that the electronic key 52, that is, the driver holding it, is not validated, thereby storing in the memory 53a the validation result indicative of "non-certificated user" in step S15.

When initiating operations by the turning on of the main relay 49 in response to the turning on of the ignition switch 31, the microcomputer 11 of the ECU 1 communicates encrypted data for validation with the immobilizer ECU 53 via the communication line 51 in step S20 of FIG. 2B.

Based on the communication result in step S20, the microcomputer 11 determines whether the first vehicle ID stored in the electronic key 52 is matched with the second vehicle ID stored in the immobilizer ECU 53, in other words, whether the user has been certificated in step S21.

For example, in step S20, when the validation result indicative of "certificated user" has been stored in the memory 53a, upon receipt a specified code sent from the ECU 1, the immobilizer ECU 53 subjects the received specified code to a predetermined process in accordance with a predetermined encryption rule, thereby transmitting the predetermined-processed code to the ECU 1.

When determining that the predetermined-processed code transmitted from the immobilizer ECU 53 is expected, the microcomputer 11 transmits a specified code to the immobilizer ECU 53. The immobilizer ECU 53 subjects the received specified code to a predetermined process in accordance with the predetermined encryption rule, thereby transmitting the predetermined-processed code to the ECU 1.

When these repeat communications of codes have been successfully completed at a predetermined number of times, the ECU determines that the electronic key 52, that is, the driver holding it, is validated in step S21, thereby storing in its memory unit, such as a volatile or nonvolatile memory unit, 11a a validation result indicative of "certificated user" in step S22.

In contrast, these repeat communications of codes have been unsuccessfully completed, the ECU determines that the electronic key 52, that is, the driver holding it, is not validated in step S21, thereby storing in its memory unit 11a a validation result indicative of "non-certificated user" in step S23.

Next, tasks to be executed by the microcomputer 11 in accordance with corresponding programs P stored in the memory unit 11a will be described hereinafter with reference to FIGS. 3 to 5; this task is required for the microcomputer 11 to automatically start the engine 2.

FIG. 3 schematically illustrates, as one of the tasks, an automatic-start control task to be executed by the microcomputer 11 at regular cycles. The automatic-start control task allows determination of whether the automatic start of the engine 2 is carried out.

As illustrated in FIG. 3, when launching the automatic-start control task (that is, at least one of the programs P corresponding thereto), the microcomputer 11 reads out the level of the starter switch signal input from the input circuit 19. Then, the microcomputer 11 determines whether the starter switch 33 is turned on by a manual operation of the driver based on the readout level in step S110.

Note that, in step S110, when the duration of the active level of the starter switch signal, such as the high level in the embodiment, is equal to or greater than a predetermined period, the microcomputer 11 determines that the starter switch 33 is turned on by the driver. This can prevent false detection of the turning on of the starter switch due to noise.

As another detection method, when the readout levels of the starter switch signal at two or more continuous timings are active (high), the microcomputer 11 determines that the starter switch 33 is turned on.

When it is determined that the starter switch 33 is manually turned on (the determination in step S110 is YES), the microcomputer 11 sets a flag to "1" in step S120; this flag "1" represents whether the starter switch 33 was or has been turned on.

The flag will be referred to as "STASW latch flag". Note that, for example, the STASW flag is for example set by software in the microcomputer 11 each time the microcomputer 11 is activated. "0" indicative of the off state of the starter switch 33 is set as default information during the microcomputer's start-up process.

Specifically, the STASW flag is indicative of historical information representing that the turning on of the starter switch 33 has existed.

Next, in step S125, the microcomputer 11 counts up, by 1, a timer (software timer or hardware timer integrated therein) from its initial value of 0, for example, every clock cycle of the microcomputer 11 or every increment cycle of another timer process executed by the microcomputer 11.

Otherwise when it is determined that the starter switch 33 is in off state (the determination in step S110 is NO), the microcomputer 11 proceeds to step S130.

In step S130, the microcomputer 11 accesses the memory unit 11a and determines whether the validation result has been stored in the memory unit 11a, in other words, whether the validation communication task in steps S20 to S22 or S23 in FIG. 2B has been completed.

When it is determined that the validation communication task in steps S20 to S22 or S23 in FIG. 2B has not been completed yet (the determination in step S130 is NO), the microcomputer 11 exits the automatic start control task.

Otherwise when it is determined that the validation communication task in steps S20 to S22 or S23 in FIG. 2B has already been completed (the determination in step S130 is YES), the microcomputer 11 proceeds step S140.

In step S140, the microcomputer 11 reads out the validation result from the memory unit 11a, and determines whether the readout validation result represents "certificated user".

When it is determined that the readout validation result represents "certificated user" (the determination in step S140 is YES), the microcomputer 11 proceeds to step S150. In step S150, the microcomputer 11 reads out the level of the ignition switch signal input from the input circuit 19, and determines whether the ignition switch 31 is in on state based on the readout level.

When it is determined that the ignition switch 31 is in on state (the determination in step S150 is YES), the microcomputer 11 references the STASW flag, and determines whether the STASW flag is set to "1" in step S160.

When it is determined that the STASW flag is set to "1" (the determination in step S160 is YES), the microcomputer 11 determines that the starter switch 33 is in on state, thereby determining that first automatic-start execution condition is satisfied, proceeding to step S170; this first automatic-start execution condition represents that the validation result is "certificated user", and the starter switch 33 was or has been turned on.

In step S170, the microcomputer 11 determines whether a second automatic-start execution condition different from the first automatic-start execution condition is satisfied based on the items of vehicle operating condition data.

Specifically, when the shift position of the automatic transmission is a neutral (N) gear position or a parking (P) gear position, the brake pedal is operated, and the vehicle speed is not more than a predetermined value, such as zero, the microcomputer 11 determines that the second automatic-start execution condition is satisfied.

The gear position, the operating state of the brake pedal, and the vehicle speed can be obtained based on the shift position signal output from the shift position sensor 47, the brake-pedal operation signal output from the brake pedal sensor 45, and the vehicle speed signal output from the vehicle speed sensor 48, respectively. Note that the neutral gear position of the automatic transmission represents that the engine 2 is unable to drive the wheels, and the park (P) gear position represents that the drive wheels are locked.

Moreover, the gear position, the operating state of the brake pedal, and the vehicle speed can be obtained from the other ECUs 53, 55, 57, and 59 via the communication line 51.

Specifically, the second automatic-start execution condition represents that the vehicle is either decelerating or being stopped. The vehicle operating conditions (decelerating or being stopped) reliably allow the automatic start operation of the vehicle.

When it is determined that the second automatic-start execution condition is satisfied (the determination in step S170 is YES), the microcomputer 11 proceeds to step S180.

In step S180, the microcomputer 11 sets a start-request flag to "1"; this start-request flag "1" requests drive of the starter relay 7 in a starter-relay drive task described hereinafter and illustrated in FIG. 4.

Note that, for example, the start-request flag is for example set by software in the microcomputer 11 each time the microcomputer 11 is activated. "0" representing that there is no requirement of starter-relay driving is set as default information during the microcomputer's start-up process.

After the operation in step S1180, the microcomputer 11 resets the STASW latch flag to "0" indicative of the off state of the starter switch 33 in step S190, thereby exiting the automatic start control task. In other words, in step S180, the microcomputer 11 rewrites the historical information indicative of "1" into another information indicative of "0". In addition, the microcomputer 11 can eliminate the STASW latch flag.

Otherwise when it is determined that:
the readout validation result represents "non-certificated user" (the determination in step S140 is NO);
the ignition switch 31 is in off state (the determination in step S150 is NO);
the STASW flag is set to "0" (the determination in step S160 is NO); and
the second automatic-start execution condition is not satisfied (the determination in step S170 is NO),
the microcomputer 11 shifts to step S190 and resets the STASW latch flag to "0", thereby exiting the automatic start control task.

Figure 4:
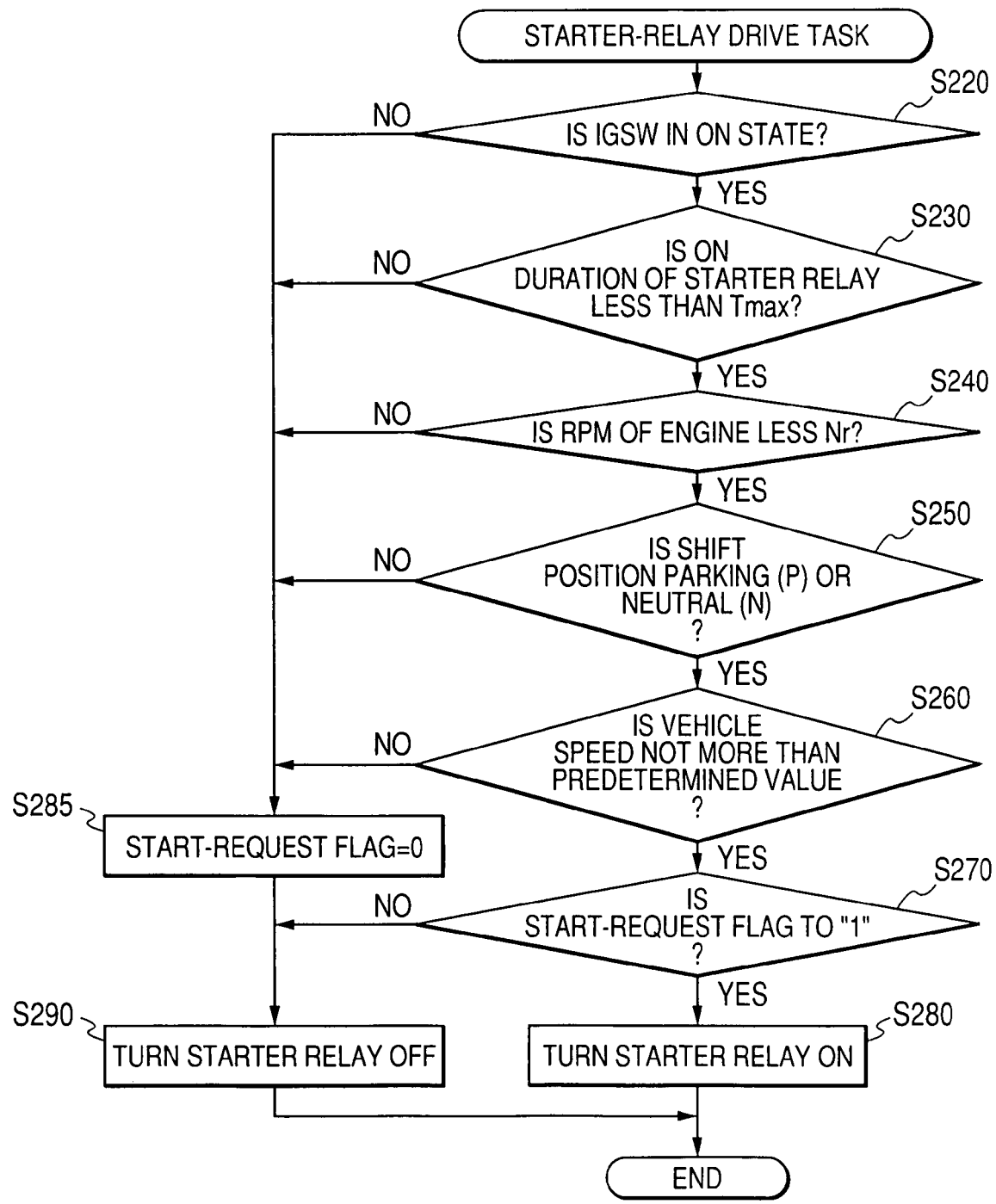
FIG. 4 is a flowchart schematically illustrating a starter-relay drive task to be executed by the microcomputer at regular intervals concurrently with the automatic-start control task according to the first embodiment.

Next, FIG. 4 schematically illustrates, as another one of the tasks, the starter-relay drive task to be executed by the microcomputer 11 at regular cycles concurrently with the automatic-start control task.

The starter-relay drive task allows determination of whether the starter motor 3 is driven and control of the starter relay 7 based on the determination result.

As illustrated in FIG. 4, when launching the starter-relay drive task (that is, at least one of the programs P corresponding thereto), the microcomputer 11 reads out the level of the ignition switch signal input from the input circuit 19, and determines whether the ignition switch 31 is in on state based on the readout level in step S220.

When it is determined that the ignition switch 31 is in on state (the determination in step S220 is YES), the microcomputer 11 determines whether an on duration of the starter relay 7 is less than a predetermined limit period of time (maximum period of time) Tmax in step S230. Note that the limit period of time Tmax represents the upper limit value of the on duration of the starter relay 7.

When it is determined that the on duration of the starter relay 7 is less than the predetermined limit period of time Tmax (the determination in step S230 is YES), the microcomputer 11 determines whether the RPM of the engine 2 is less than a predetermined number Nr of revolutions, such as 7000 in step S240.

Note that the RPM of the engine 2 can be calculated based on an interval of temporally adjacent same-directed edges of the crank signal by the microcomputer 11.

The predetermined number Nr of revolutions, such as 7000, of the engine 2 allows air-fuel mixture fed into the combustion chamber of a cylinder of the engine 2 to allow complete combustion to take place.

When it is determined that the RPM of the engine 2 is less than the predetermined number Nr of revolutions (the determination in step S240 is YES), the microcomputer 11 proceeds to step S250. In step S250, the microcomputer 11 determines whether the shift position of the automatic transmission is the neutral (N) gear position or the parking (P) gear position.

When it is determined that the shift position of the automatic transmission is the neutral (N) gear position or the parking (P) gear position (the determination in step S250 is affirmative), the microcomputer 11 goes to step S260. In step S260, the microcomputer 11 determines whether the vehicle speed is not more than the predetermined value, such as zero. When it is determined that the vehicle speed is not more than the predetermined value (the determination in step S260 is YES), the microcomputer 11 proceeds to step S270.

In step S270, the microcomputer 11 determines whether the start-request flag is set to "1". When it is determined that the start-request flag is set to "1" (the determination in step S270 is affirmative), the microcomputer 11 proceeds to step S280.

In step S280, the microcomputer 11 turns the level of the starter-relay drive signal to be sent to the gates of the high-side and low-side transistors Tr1 and Tr2 of the starter-relay driver 13 from the inactive level to the active level, and thereafter, exiting the starter-relay drive task.

The starter-relay drive signal with the active level allows the high-side and low-side transistors Tr1 and Tr2 to be turned on. It is possible therefore to cause a current to flow through the coil 9 based on the battery voltage of the power supply line 15 to thereby energize the coil 9 Energization of the coil 9 permits the contact 7a of the starter relay 7 to short-circuit, so that the starter relay 7 is turned on.

Otherwise when it is determined that the start-request flag is set to "0" (the determination in step S270 is negative), the microcomputer 11 proceeds to step S290.

In step S290, the microcomputer 11 turns the level of the starter-relay drive signal to be sent to the gates of the high-side and low-side transistors Tr1 and Tr2 from the active level to the inactive level, and thereafter, exiting the starter-relay drive task.

The starter-relay drive signal with the inactive level allows the high-side and low-side transistors Tr1 and Tr2 to be turned off. This prevents a current from flowing through the coil 9 to thereby disenergize the coil 9. The disenergizing of the coil 9 causes the contact 7a of the starter relay 7 to be opened, so that the starter relay 7 is turned off.

Otherwise when any one of the determinations in steps S220, S230, S240, S250, and S260 is negative, the microcomputer 11 proceeds to step S285.

As described above, in step S285, the microcomputer 11 resets the starter-request flag to "0", and turns the starter relay 9 off, and thereafter, exiting the starter-relay drive task in steps S285 and S290.

Figure 5:
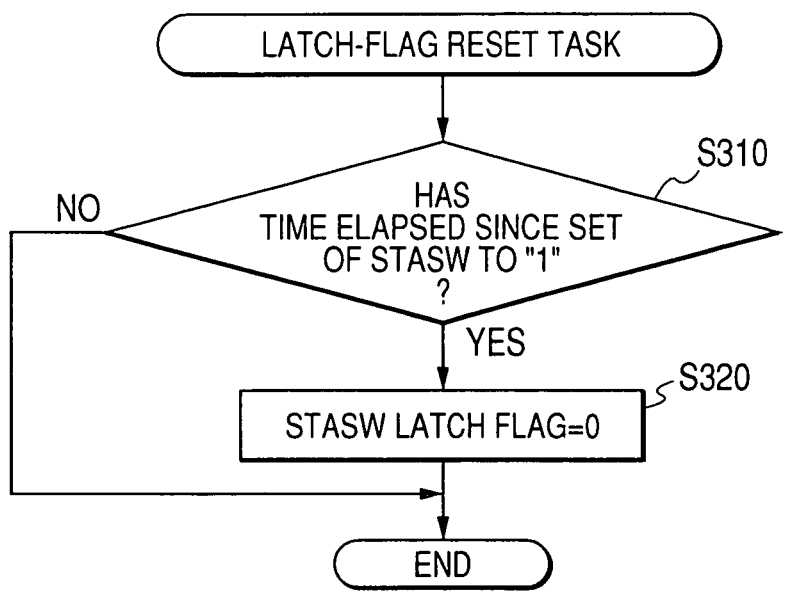
FIG. 5 is a flowchart schematically illustrating a latch-flag reset task to be executed by the microcomputer at regular intervals concurrently with the automatic-start control task and the starter-relay drive task according to the first embodiment.

Next, FIG. 5 schematically illustrates, as another one of the tasks, a latch-flag reset task to be executed by the microcomputer 11 at regular cycles concurrently with the automatic-start control task and the starter-relay drive task.

As illustrated in FIG. 5, when launching the latch-flag reset task (that is, at least one of the programs P corresponding thereto), the microcomputer 11 reads out the count value of the timer whose count operation has been started since the operation in step S125 of FIG. 3. Next, the microcomputer 11 determines whether a predetermined time has elapsed since the set of STASW latch flag to "1" in step S310.

Specifically, in step S310, the microcomputer 11 determines whether the count value of the timer is equal to or greater than a predetermined threshold value corresponding to the predetermined time.

When it is determined that the predetermined time has not elapsed yet (the determination in step S310 is NO), the microcomputer 11 exits the latch-flag reset task. Otherwise when it is determined that the predetermined time has elapsed (the determination in step S310 is YES), the microcomputer 11 resets the STASW latch flag to "0" indicative of the off state of the starter switch 33, thereby exiting the latch-flag reset task.

Next, overall operations of the ECU 1 will be described hereinafter with reference to FIG. 6.

Figure 6:
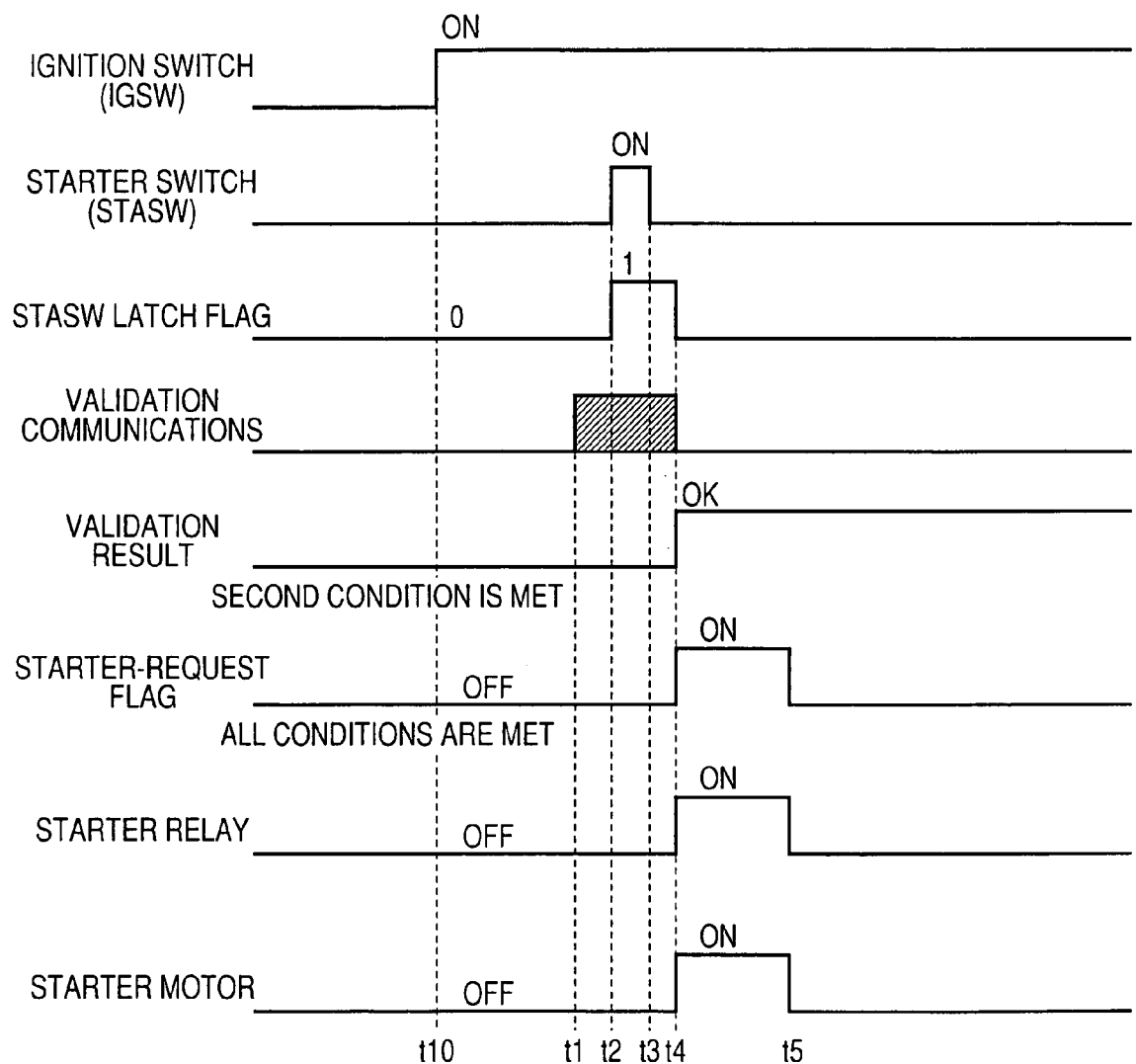
FIG. 6 is a timing chart schematically illustrating overall operations of the engine ECU according to the first embodiment.

As illustrated in FIG. 6, when the ignition switch 31 is turned on (see t0 in FIG. 6), the microcomputer 11 starts working. Thereafter, the microcomputer 11 carries out the validation communication task (see steps S20 to S22 or S23 in FIG. 2B and t1 in FIG. 6).

In parallel to the validation communication task, the microcomputer 11 monitors whether the starter switch 33 is turned on by the driver (see step S110 and t2 in FIG. 6). When it is determined that the starter switch 33 is turned on (see "YES" in step S110), the STASW latch flag is set to "1" (see step S120). This allows the STASW latch flag to be kept "1" even though the starter switch 33 is turned off before completion of the validation communication task in steps S20 to S22 or S23 (see t3 in FIG. 6).

Thereafter, when it is determined that the validation communication task in steps S20 to S22 or S23 is completed (see "YES" in step S130 and see t4 in FIG. 6), and the validation result represents "certificated user" (see "YES" in step S140 and t5 in FIG. 6), determination of whether the starter switch 33 has been or was turned on is carried out by the microcomputer 11 (see step S160).

Specifically, in step S160, it is determined whether the STASW latch flag is set to "1". When the latch flag is set to "1" (see "YES" in step S160), it is determined that the starter switch 33 has been or was turned on. Note that the STASW latch flag is reset to "0" after the operation in step S160 (see step S190 and t5 in FIG. 6).

When the STASW latch flag is set to "1" so that the starter switch 33 has been or was turned on, if the second automatic-start execution condition has been satisfied (see "YES" in step S170), the start-request flag is set to "1" (see step S180 and t4 in FIG. 6).

While the start-request flag is set to "1", when all of the conditions required in steps S220 to S260 have been satisfied, the starter relay 7 is turned on (see step S280 and t4 in FIG. 6). The turning on of the starter relay 7 allows the starter motor 3 to turn over, clanking the engine 2.

Thereafter, the microcomputer 11 specifies the current rotational position of the crankshaft, in other words, determines a cylinder at a predetermined crank angle based on the crank signal, the intake cam signal, and the exhaust cam signal. After the determination of the rotational position of the crankshaft, the microcomputer 11 drives some of the actuators AC, such as injectors and igniters, thereby starting fuel injection and ignition with respect to the cylinders of the engine 2 in a given order.

Thereafter, when the RPM of the engine 2 is equal to or greater than the predetermined number Nr of revolutions (see "NO" in step S240), the microcomputer 11 determines that air-fuel mixture fed into the combustion chamber of a cylinder of the engine allows complete combustion to take place. Then, the microcomputer 11 resets the start-request flag to zero, and turns off the starter relay 7, thereby stopping the starter motor 3 (see steps S285 and S290 in FIG. 4 and t5 in FIG. 6).

Specifically, after the start-request flag is set to "1" based on establishment of the first and second conditions, it is possible for the microcomputer 11 to carry out the starter-relay drive task illustrated in FIG. 4, whereby to automatically drive the starter motor 3 to crank the engine 2 even if the starter switch 33 is in off state.

As described above, if the starter switch 33 has been pushed for a short time, there is the possibility that the starter switch 33 has been turned from on to off upon completion of the validation communications between the immobilizer ECU 53 and the ECU 1.

In this case, in the first embodiment of the present invention, because the STASW latch flag is set to "1", and therefore, the STASW latch flag "1" allows determination of that the starter switch 33 was or has been turned on. As a result, it is possible to prevent the first automatic-start execution condition from becoming unsatisfied; this first automatic-start condition represents that the validation result is "certificated user", and the starter switch 33 was or has been turned on.

Accordingly, even if the starter switch is in off state before the validation result indicative of "certificated user" is obtained by the validation communications between the immobilizer ECU 53 and the ECU 1, it is possible to stably start the engine 2.

In addition, the STASW latch flag is reset to "0" after it is referenced by the operation of the microcomputer 11 in step S160, or when it is determined that the validation result represents "non-certificated user" (see step S190). This allows the duration of the STASW flag being set to "1" to be kept at a minimum, making it possible to reliably prevent erroneous determination of turning on of the starter switch 33 although the starter switch 33 is actually in off state.

In the first embodiment, when the predetermined time has elapsed since the STASW latch flag being set to "1", the STASW flag is reset to "0" (see "YES" in step S310 and step S320). This can reliably prevent the STASW flag from remaining at "1"

Even though the starter switch 33 is turned on, when the determination operation in step S160 is not carried out because the validation communications have been completed within the predetermined time, the turning on of the starter relay 7 based on the automatic-start control task is not carried out. It is possible to more reliably prevent third party's improper actions from starting the engine 2.

Second Embodiment

Next, an ECU according to a second embodiment of the present invention will be described hereinafter. Note that the ECU according to the second embodiment is identical to the ECU 1 according to the first embodiment in hardware configuration, and therefore, like reference characters are assigned to like parts in the ECU 1 according to the first embodiment and the ECU according to the second embodiment, so that descriptions of the parts of the ECU according to the second embodiment will be omitted.

Figure 7:
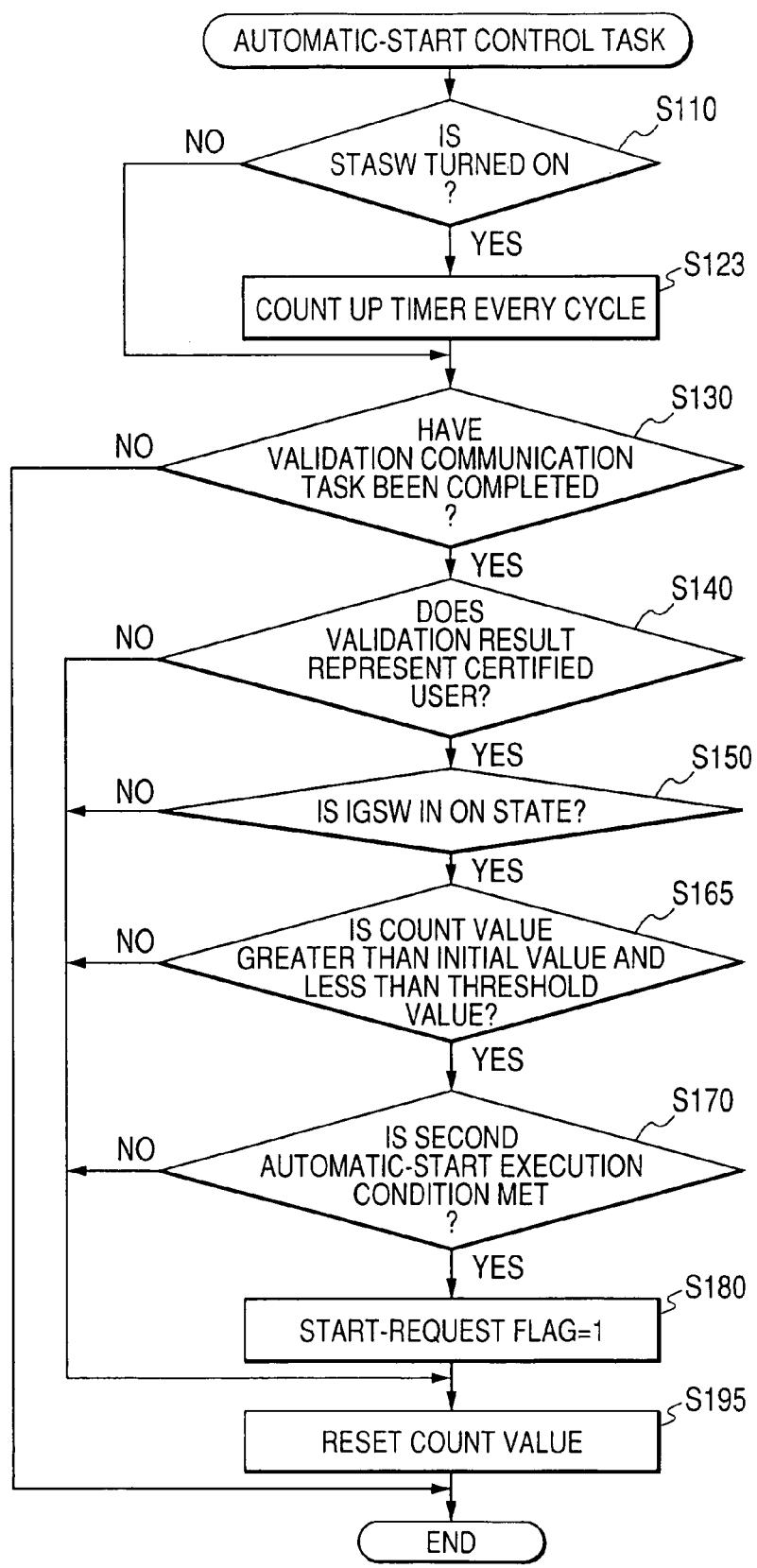
FIG. 7 is a flowchart schematically illustrating an automatic-start control task to be executed by the microcomputer of the engine ECU at regular intervals according to a second embodiment of the present invention.
Figure 8A:
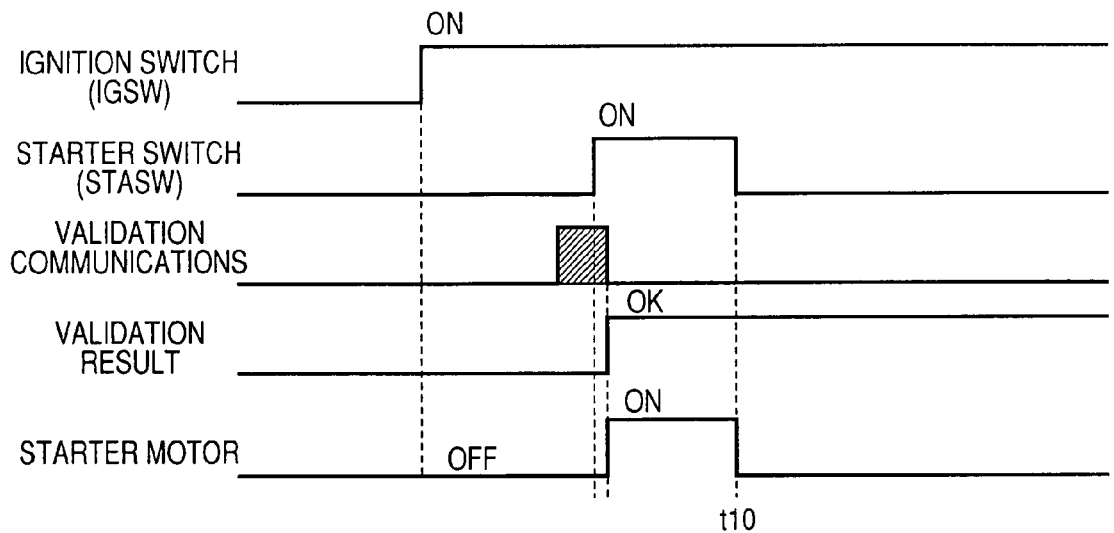
FIG. 8A is a timing chart schematically illustrating conventional operations of a manual engine starter system.
Figure 8B:
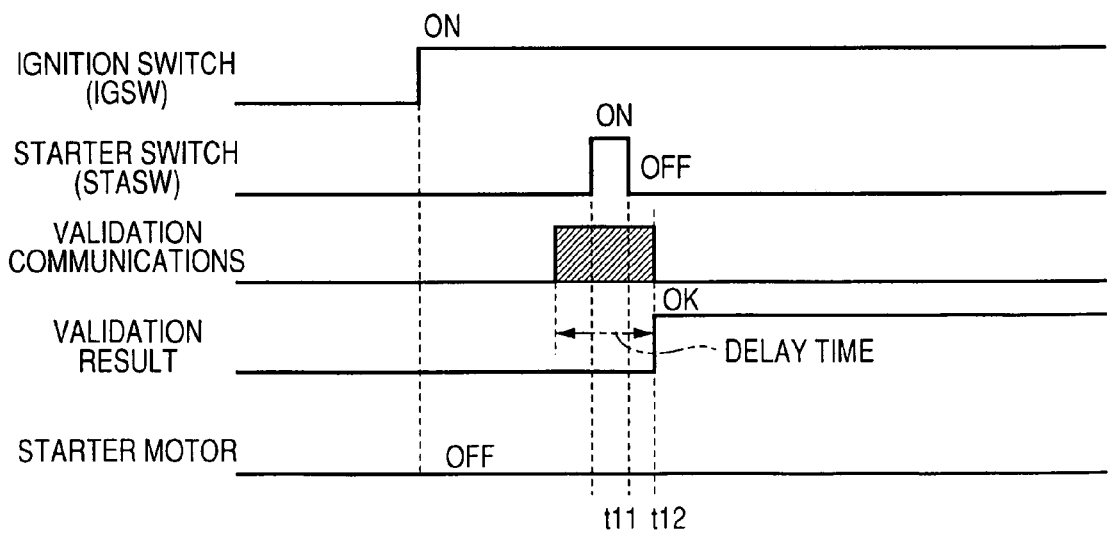
FIG. 8B is a timing chart schematically illustrating conventional operations of an automatic engine starter system.

As compared with the ECU 1, the microcomputer 11 of the ECU according to the second embodiment is programmed to an automatic-start control task illustrated in FIG. 7 in place of that illustrated in FIG. 3 without executing the latch-flag reset task.

The automatic-start control task illustrated in FIG. 6 substantially has the following first to fourth points different from that illustrated in FIG. 3.

As the first different point, when it is determined that the starter switch 33 is manually turned on, the microcomputer 11 shifts to step S123 in place of step S120. In step S123, the microcomputer 11 counts up, by 1, a timer (software timer or hardware timer integrated therein) from its initial value of 0, for example, every clock cycle of the microcomputer 11 or every increment cycle of another timer process executed by the microcomputer 11.

As the second different point, the operation in step S125 is omitted. In other words, in the automatic-start control task illustrated in FIG. 6, the operation in step S120 is omitted, and the operation in step S123 is functionally equivalent to that in step S125.

As the third different point, when it is determined that the ignition switch 31 is in on state (the determination in step S150 is YES), the microcomputer 11 shifts to step S165 in place of step S160.

Specifically, in step S165, the microcomputer 11 determines whether the count value of the timer in step S123 is greater than the initial value of 0 and less than the predetermined threshold value corresponding to the predetermined time described in step S310 of FIG. 5.

Specifically, the predetermined time in step S310 is equivalent to a period of time required for the count value of the timer increases from the initial value up to the threshold value.

As the fourth different point, after the operation in step S180, the microcomputer 11 shifts to step S195 in place of step S190. Specifically, the microcomputer 11 resets the count value of the timer in step S123 to the initial value of "0", and disables the counting operation of the timer 123.

Specifically, in the second embodiment, the count value of the timer set in step S123 serves as historic information indicative of whether the starter switch 33 was or has been turned on. When it is determined that the starter switch 33 is manually turned on (see "YES" in step S110), the timer is started to be incremented by 1, for example, every clock cycle of the microcomputer 11 (see step S123). In the determination operation in step S165 after it is determined that the readout validation result represents "certificated user", when the count value of the timer in step S123 is greater than the initial value of 0 and less than the predetermined threshold value corresponding to the predetermined time described in step S310 of FIG. 5, it is determined that the starter switch 33 was or has been turned on.

According to the second embodiment, it is possible to obtain the same effects as the first embodiment without requiring the STASW latch flag and the timer. In addition, the latch-flag reset task illustrated in FIG. 5 can be omitted.

In each of the first and second embodiments, as the timers in steps S123 and S125, a down counter timer can be used. The down counter timer is configured to count down by 1 from an initial value greater than 0 every clock cycle of the microcomputer 11 or every increment cycle of another timer process executed by the microcomputer 11.

In this modification, in the determination operation in step S165, when the count value of the down counter timer is less than the initial value and greater than a predetermined threshold value, such as 0, it is determined that the starter switch 33 was turned on, execution of the microcomputer 11 proceeds to step S170. Note that, in this modification, the predetermined time in step S310 is equivalent to a period of time required for the count value of the timer decreases from the initial value up to the predetermined threshold value.

In the first and second embodiments and their modifications, the ECU 1 starts operating in response to the turning on of the ignition switch 31, but the present invention is not limited to the structure. Specifically, the ECU 1 can start operating before the turning on of the ignition switch 31. For example, the ECU 1 can start operating in response to receiving a door opening signal from the body ECU 59; this door opening signal represents that a door of the vehicle is opened.

Moreover, in the first and second embodiments and their modifications, the ECU 1 carries out the validation communications with the immobilizer ECU 53 as illustrated in FIG. 2B, but the ECU 1 can directly carry out the validation communications with the electronic key 52 as illustrated in FIG. 2B, thereby determining whether the electronic key 52, that is, the driver holding it, is validated.

In the first and second embodiments and their modifications, the automatic transmission is used as a transmission of the vehicle, but a manual transmission can be used. In this modification, in place of the operations in step S170 of FIG. 7 and step S250 in FIG. 4, the microcomputer 11 can determine whether a clutch pedal installed in the vehicle is depressed.

Specifically, when the clutch pedal of the vehicle is depressed, the microcomputer 11 performs the same determination as that the shift position of the automatic transmission is the neutral (N) gear position or the parking (P) gear position.

In the first and second embodiments and their modifications, the elements provided in the ECU 1 can be implemented as dedicated hardware devices, such as custom LSI (Large-Scale Integration) circuits.

In the first and second embodiments and their modifications, the present invention is applied to an ECU for controlling an engine, but the present invention is not limited to the application. This application is preferable because operations of such an ECU designed to control drive of a vehicle must be highly ensured.

In the first and second embodiments and their modifications, the starter switch 33 is designed as a push button switch, but the present invention is not limited to the structure. Specifically, a starter switch can be designed to be turned on when the ignition key being inserted in the key cylinder of the vehicle is located to the starter position by the driver.

Moreover, those skilled in the art will appreciate that the present invention is capable of being distributed as program products in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A system for automatically starting an engine installed in a vehicle, the system comprising:
   a storing unit configured to store historical information in response to when a starter switch is manually performed exclusively by a user to transiently trigger automatic start of the engine, the historical information representing that the user's manual momentary operation of the starter switch has occurred;
   a validation unit having a first identifier uniquely identifying the vehicle and configured to:
      carry out validation communications, in at least one of direct and indirect procedures, with a communication device storing therein a second identifier of the vehicle, the communication device being used by a user of the vehicle, the validation communications using the first identifier and the second identifier; and
      validate whether the user of the vehicle is certificated based on the validation communication result; and
   an engine starting unit configured to:
      monitor whether the starter switch is turned on by the user in parallel to the operation of the validation communications, disable start of the engine after the user's momentary operation of the starter switch when the starter switch is off and the historical information has not been stored by the storing unit, and automatically start the engine when the historical information has been stored by the storing unit even if the manual performance of the starter switch is turned off before completion of the validation communications, simultaneously with when it is determined that the user of the vehicle is certificated.

2. A system according to claim 1, further comprising a rewriting unit configured to carry out any one of rewriting of the historical information into another information and eliminating of the historical information after the automatic engine-start is completed and when it is determined that the user of the vehicle is not certificated.

3. A system according to claim 1, wherein the historical information includes a flag representing that the user's manual momentary operation of the starter switch has occurred.

4. A system according to claim 1, further comprising:
a determining unit configured to determine whether a predetermined time has elapsed since the store of the historical information by the storing unit; and
a rewriting unit configured to carry out at least one of rewriting of the historical information into another information and eliminating of the historical information when it is determined that the predetermined time has elapsed since the store of the historical information by the storing unit.

5. A system according to claim 1, wherein the historical information includes a variable, the storing unit is configured to, in response to the user's manual momentary operation of the starter switch, start to change the variable from an initial value by a constant value every predetermined time, and the engine starting unit is configured to automatically starting the engine when the variable is changed from the initial value and when it is determined that the user of the vehicle is certificated.

6. A system according to claim 5, wherein the engine starting unit is configured to automatically start the engine when the variable is greater than the initial value and less than a predetermined threshold value greater than the initial value and when it is determined that the user of the vehicle is certificated.

7. A system according to claim 1, further comprising:
a vehicle operating condition obtaining unit having a plurality of sensors arranged in the vehicle, the plurality of sensors being configured to measure various items of information associated with the operating conditions of the vehicle including operating conditions of the engine, the vehicle operating condition obtaining unit being configured to obtain the operating conditions of the vehicle based on the measured items of information,
wherein the engine starting unit is configured to automatically start the engine when the historical information has been stored by the storing unit, when it is determined that the user of the vehicle is certificated, and when it is determined that the obtained operating conditions represent that the vehicle is either decelerating or being stopped.

8. A program product embedded in a non-transitory computer-readable storage media accessible by a computer for automatically starting an engine installed in a vehicle, the computer storing a first identifier uniquely identifying the vehicle, the program product comprising:

first means for instructing the computer to store historical information in response to when a starter switch is manually performed exclusively by a user to transiently trigger automatic start of the engine, the historical information representing that the user's manual momentary operation of the starter switch has occurred;

second means for instructing the computer to:
carry out validation communications, in at least one of direct and indirect procedures, with a communication device storing therein a second identifier of the vehicle, the communication device being used by a user of the vehicle, the validation communications using the first identifier and the second identifier; and
validate whether the user of the vehicle is certificated based on the validation communication result; and third means for instructing the computer to:
monitor whether the starter switch is turned on by the user in parallel to the operation of the validation communications,
disable start of the engine after the user's momentary operation of the starter switch when the starter switch is off and the historical information has not been stored by the storing unit, and
carry out an automatic starting operation of the engine when the historical information has been stored even if the manual performance of the starter switch is turned off before completion of the validation communications, simultaneously with when it is determined that the user of the vehicle is certificated.

9. A program product according to claim 8, further comprising a fourth means for instructing the computer to perform any one of rewriting of the historical information into another information or eliminating of the historical information after the automatic engine-start is completed and when it is determined that the user of the vehicle is not certificated.

10. A program product according to claim 8, wherein the historical information includes a flag representing that the user's manual momentary operation of the starter switch has occurred.

11. A program product according to claim 8, further comprising:
a fourth means for instructing the computer to determine whether a predetermined time has elapsed since the storing of the historical information; and
a fifth means for instructing the computer to perform any one of rewriting of the historical information into another information and eliminating of the historical information when it is determined that the predetermined time has elapsed since the storing of the historical information.

12. A program product according to claim 8, wherein the historical information includes a variable, the first means is configured to instruct the computer to, in response to the user's manual momentary operation of the starter switch, start to change the variable from an initial value by a constant value every predetermined time, and the third means is configured to instruct the computer to automatically start the engine when the variable is changed from the initial value and when it is determined that the user of the vehicle is certificated.

13. A program product according to claim 12, wherein the third means is configured to instruct the computer to automatically start the engine when the variable is greater than the initial value and less than a predetermined threshold value greater than the initial value and when it is determined that the user of the vehicle is certificated.

14. A program product according to claim 8, further comprising:

a fourth means for instructing the computer to obtain the operating conditions of the vehicle based on measured items of information associated with operating conditions of the vehicle including operating conditions of the engine;

wherein the third means is configured to instruct the computer to automatically start the engine when the historical information has been stored, when it is determined that the user of the vehicle is certificated, and when it is determined that the obtained operating conditions represent that the vehicle is either decelerating or being stopped.

15. A system according to claim 1, wherein the storing unit operates to carry out the storing of the historical information at least during the validation communications.

16. A program product according to claim 8, wherein the first means operates to carry out the storing of the historical information at least during the validation communications.

17. A system for automatically starting an engine installed in a vehicle according to claim 1, wherein the engine starting unit determines whether the historical information has been stored by the storing unit and whether the user of the vehicle is certificated before starting the engine.

18. A system for automatically starting an engine installed in a vehicle according to claim 1, wherein the validation unit starts carrying out the validation communications when an authentication start condition is satisfied, and the authentication start condition is inevitably satisfied when the user gets inside of the vehicle.

19. A system for automatically starting an engine installed in a vehicle according to claim 1, wherein the validation unit periodically communicates with the vehicle and repeats determining whether an authentication start condition is satisfied, if the authentication start condition is satisfied, the validation unit starts carrying out the validation communications, and the authentication start condition is that, after a driver's seat door is unlocked, the driver's seat door is closed, opened, and closed, in this order.

20. A program product embedded in a non-transitory computer-readable media accessible by a computer for automatically starting an engine installed in a vehicle, the computer storing a first identifier uniquely identifying the vehicle, the program product comprising:

first means for instructing the computer to monitor an operation of a starter switch installed in the vehicle, the starter switch is configured to be manually performed by a user to transiently trigger automatic start of the engine;

second means for instructing the computer to:
  carry out validation communications, in at least one of direct and indirect procedures, with a communication device storing therein a second identifier of the vehicle, the communication device being configured to be attached to the user, the validation communications using the first identifier and the second identifier; and
  validate whether the user is certificated based on the validation communication result;

third means for instructing the computer to carry out an automatic starting operation of the engine; and fourth means for instructing the computer to store historical data based on outputs of the first means, the historical data representing that the starter switch was performed, the historical data having been kept even after stop of the user's performance of the starter switch, wherein, the first means instructs the computer to monitor whether the starter switch is turned on by the user in parallel to the operation of the validation communications, the third means does not instruct the computer to carry out the automatic starting operation after the user's momentary operation of the starter switch when the historical information has not been stored and the starter switch is off, and the third means instructs the computer to carry out the automatic starting operation when the historical information has been stored and simultaneously with when it is determined that the user is certificated by the second means.

21. A system according to claim 1, wherein the starter switch is a push button switch.

22. A program product according to claim 8, wherein the starter switch is a push button switch.

23. A program product according to claim 20, wherein the starter switch is a push button switch.

24. A system according to claim 17, wherein the engine starting unit refers to the storing unit to determine whether the historical information has been stored by the storing unit.

25. A system for automatically starting an engine installed in a vehicle, the system comprising:

a storing unit configured to store historical information in response to when a starter switch is manually performed exclusively by a user to transiently trigger automatic start of the engine, the historical information representing that the user's manual momentary operation of the starter switch has occurred;

a validation unit having a first identifier uniquely identifying the vehicle and configured to:
  carry out validation communications, in at least one of direct and indirect procedures, with a communication device storing therein a second identifier of the vehicle, the communication device being used by a user of the vehicle, the validation communications using the first identifier and the second identifier; and
  validate whether the user of the vehicle is certificated based on the validation communication result; and an engine starting unit configured to monitor whether the starter switch is turned on by the user in parallel to the operation of the validation communications, the validation communications being carried out regardless of whether operation of the starter switch is detected, disable start of the engine when the starter switch is off and the historical information has not been stored by the storing unit, and automatically start the engine when the historical information has been stored by the storing unit even if the manual performance of the starter switch is turned off before completion of the validation communications, simultaneously with when it is determined that the user of the vehicle is certificated.

26. A program product embedded in a non-transitory computer-readable storage media accessible by a computer for automatically starting an engine installed in a vehicle, the computer storing a first identifier uniquely identifying the vehicle, the program product comprising:

first means for instructing the computer to store historical information in response to when a starter switch is manually performed exclusively by a user to transiently trigger automatic start of the engine, the historical information representing that the user's manual momentary operation of the starter switch has occurred;

second means for instructing the computer to:

carry out validation communications, in at least one of direct and indirect procedures, with a communication device storing therein a second identifier of the vehicle, the communication device being used by a user of the vehicle, the validation communications using the first identifier and the second identifier; and validate whether the user of the vehicle is certificated based on the validation communication result; and third means for instructing the computer to monitor whether the starter switch is turned on by the user in parallel to the operation of the validation communications, the validation communications being carried out regardless of whether operation of the starter switch is detected, disable start of the engine when the starter switch is off and the historical information has not been stored by the storing unit, and carry out an automatic starting operation of the engine when the historical information has been stored even if the manual performance of the starter switch is turned off before completion of the validation communications, simultaneously with when it is determined that the user of the vehicle is certificated.

27. A program product embedded in a non-transitory computer-readable media accessible by a computer for automatically starting an engine installed in a vehicle, the computer storing a first identifier uniquely identifying the vehicle, the program product comprising:

first means for instructing the computer to monitor an operation of a starter switch installed in the vehicle, the starter switch is configured to be manually performed by a user to transiently trigger automatic start of the engine;

second means for instructing the computer to:
carry out validation communications, in at least one of direct and indirect procedures, with a communication device storing therein a second identifier of the vehicle, the communication device being configured to be attached to the user, the validation communications using the first identifier and the second identifier; and validate whether the user is certificated based on the validation communication result;

third means for instructing the computer to carry out an automatic starting operation of the engine; and fourth means for instructing the computer to store historical data based on outputs of the first means, the historical data representing that the starter switch was performed, the historical data having been kept even after stop of the user's performance of the starter switch, wherein, the first means instructs the computer to monitor whether the starter switch is turned on by the user in parallel to the operation of the validation communications, the validation communications being carried out regardless of whether operation of the starter switch is detected, the third means does not instruct the computer to carry out the automatic starting operation when the historical information has not been stored and the starter switch is off, and the third means instructs the computer to carry out the automatic starting operation when the historical information has been stored and simultaneously with when it is determined that the user is certificated by the second means.

28. A system for automatically starting an engine installed in a vehicle, the system comprising:

a storing unit configured to store historical information in response to when a starter switch is manually performed exclusively by a user to transiently trigger automatic start of the engine, the historical information representing that the user's manual momentary operation of the starter switch has occurred;

a validation unit having a first identifier uniquely identifying the vehicle and configured to:
carry out validation communications, in at least one of direct and indirect procedures, with a communication device storing therein a second identifier of the vehicle, the communication device being used by a user of the vehicle, the validation communications using the first identifier and the second identifier; and validate whether the user of the vehicle is certificated based on the validation communication result; and an engine starting unit configured to determine whether the starter switch is turned on by the user before and after the operation of the validation communications, disable start of the engine when the starter switch is off and the historical information has not been stored by the storing unit, and automatically start the engine when the historical information has been stored by the storing unit even if the manual performance of the starter switch is turned off before completion of the validation communications, simultaneously with when it is determined that the user of the vehicle is certificated.

29. A program product embedded in a non-transitory computer-readable storage media accessible by a computer for automatically starting an engine installed in a vehicle, the computer storing a first identifier uniquely identifying the vehicle, the program product comprising:

first means for instructing the computer to store historical information in response to when a starter switch is manually performed exclusively by a user to transiently trigger automatic start of the engine, the historical information representing that the user's manual momentary operation of the starter switch has occurred;

second means for instructing the computer to:
carry out validation communications, in at least one of direct and indirect procedures, with a communication device storing therein a second identifier of the vehicle, the communication device being used by a user of the vehicle, the validation communications using the first identifier and the second identifier; and validate whether the user of the vehicle is certificated based on the validation communication result; and third means for instructing the computer to determine whether the starter switch is turned on by the user before and after the operation of the validation communications, disable start of the engine when the starter switch is off and the historical information has not been stored by the storing unit, and carry out an automatic starting operation of the engine when the historical information has been stored even if the manual performance of the starter switch is turned off before completion of the validation communications, simultaneously with when it is determined that the user of the vehicle is certificated.

30. A program product embedded in a non-transitory computer-readable media accessible by a computer for automatically starting an engine installed in a vehicle, the computer storing a first identifier uniquely identifying the vehicle, the program product comprising:

first means for instructing the computer to monitor an operation of a starter switch installed in the vehicle, the starter switch is configured to be manually performed by a user to transiently trigger automatic start of the engine;

second means for instructing the computer to:
  carry out validation communications, in at least one of direct and indirect procedures, with a communication device storing therein a second identifier of the vehicle, the communication device being configured to be attached to the user, the validation communications using the first identifier and the second identifier; and
  validate whether the user is certificated based on the validation communication result;

third means for instructing the computer to carry out an automatic starting operation of the engine; and fourth means for instructing the computer to store historical data based on outputs of the first means, the historical data representing that the starter switch was performed, the historical data having been kept even after stop of the user's performance of the starter switch, wherein, the first means instructs the computer to determine whether the starter switch is turned on by the user before and after the operation of the validation communications, the third means does not instruct the computer to carry out the automatic starting operation when the historical information has not been stored and the starter switch is off, and the third means instructs the computer to carry out the automatic starting operation when the historical information has been stored and simultaneously with when it is determined that the user is certificated by the second means.

31. A system according to claim 28, wherein the engine starting unit configured to determine whether the starter switch is turned on by the user before, during, and after the operation of the validation communications.

32. A program product according to claim 29, wherein the third means is configured to instruct the computer to determine whether the starter switch is turned on by the user before, during, and after the operation of the validation communications.

33. A program product according to claim 30, wherein the first means is configured to instruct the computer to determine whether the starter switch is turned on by the user before, during, and after the operation of the validation communications.

* * * * *